United States Patent Office 2,779,640
Patented Jan. 29, 1957

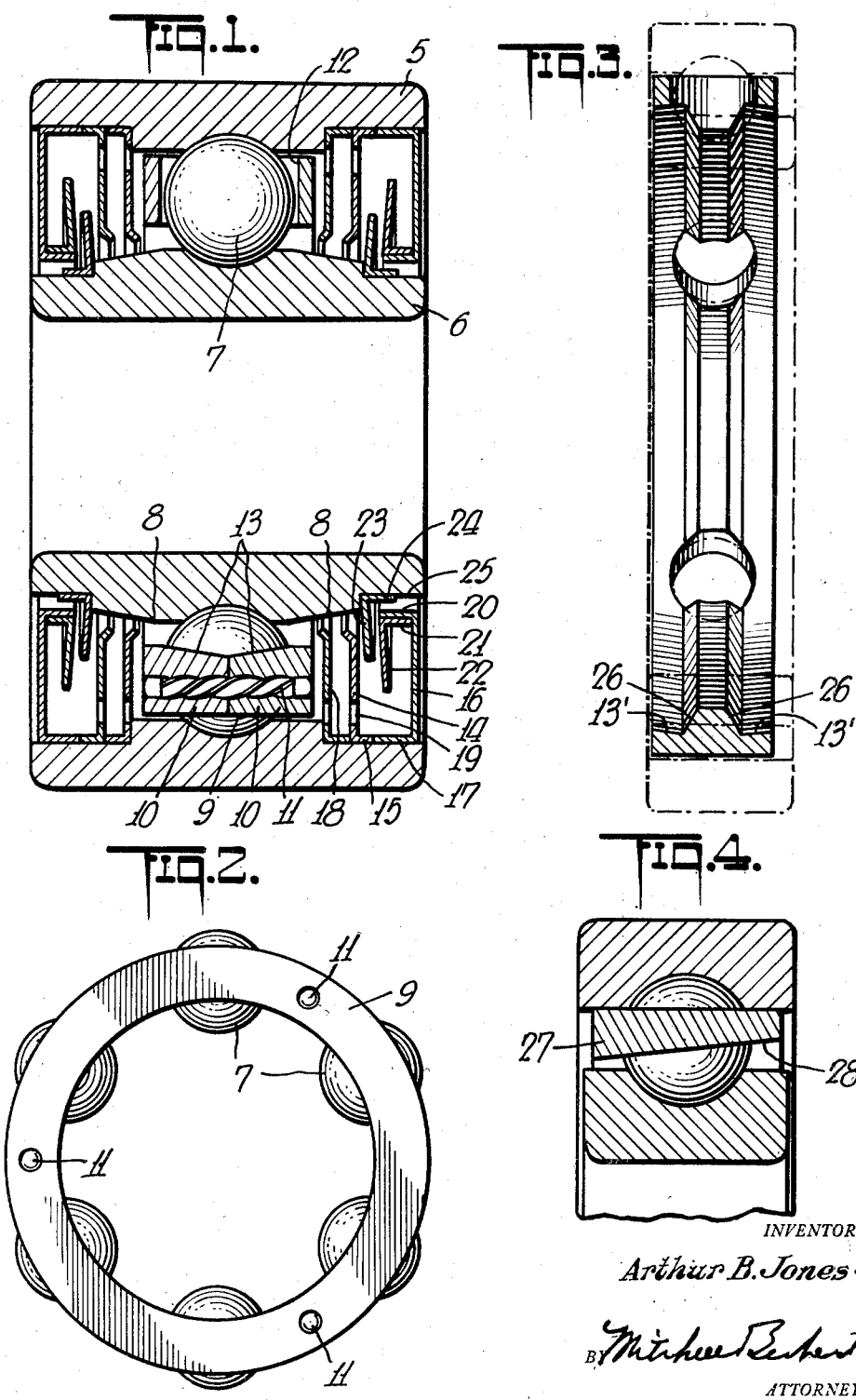

2,779,640

BEARING

Arthur B. Jones, Jr., Newington, Conn., assignor to The Fafnir Bearing Company, New Britain, Conn., a corporation of Connecticut Application December 17, 1953, Serial No. 398,666

8 Claims. (Cl. 308—187.2)

My invention relates to an antifriction bearing and particularly to means for lubricating the same and for retaining lubricant in the bearing.

It is an object of my invention to provide a bearing which may be oil lubricated, and wherein the oil will be automatically circulated upon rotation of the bearing.

It is another object to provide means for holding oil in a bearing so as to provide a substantial reservoir of oil for lubrication.

Another object is to provide a bearing with seal means or containing means for containing oil and preventing loss thereof during ordinary handling of the bearing and whether the axis thereof be either horizontal or vertical.

It is another object to provide an improved retainer for antifriction bearings.

Other objects and various features of novelty and invention will be hereinafter pointed out or will become apparent to those skilled in the art.

In the drawings:

Fig. 1 is a central vertical sectional view on an enlarged scale of a bearing illustrative of the invention;

Fig. 2 is a view in side elevation of the retainer shown in Fig. 1;

Fig. 3 is a view in generally central vertical section through a modified form of retainer.

Fig. 4 is a fragmentary view of a bearing showing a further modified form of the retainer.

In said drawings the antifriction bearing comprises an outer bearing ring 5 and inner bearing ring 6, with interposed antifriction bearing members such as balls 7. The bearing rings 5 and 6 have the usual grooves or raceways for the balls 7.

It is important to supply a small amount of lubricant to antifriction bearings. Oil lubrication is usually highly satisfactory, but heretofore it has been difficult to attain efficient oil lubrication by simple means and to hold the oil in the bearing. In the present instance, one means of assisting in providing oil lubrication is the provision of a sloping surface or surfaces on one or more rotating parts to cause oil to be centrifugally carried to the antifriction bearing members or to parts adjacent thereto.

In the form illustrated, the inner bearing ring 6 is provided with sloping surfaces 8—8 extending radially outwardly toward the raceway grooves in the bearings so that any oil falling on the inner bearing ring will tend to be thrown out centrifugally and will creep along and up the sloping surfaces 8—8, and will finally reach the balls 7 or the retainers for the balls. Thus, by the simple expedient of providing the sloping surfaces 8—8, oil lubrication is greatly facilitated.

The balls 7 are carried in a retainer 9 which, in the form shown, is formed in two parts 10—10 which may be secured together as by means of drive screw 11, as is common practice. The retainer is provided with ball pockets 12 for holding the balls in spaced-apart relationship. The retainer, in the form shown, is spaced substantially away from the inner ring and is, in effect, an outer land riding retainer. The retainer is provided with one or more sloping surfaces, in this case, two sloping surfaces 13—13 which converge in a radially outward direction so that any oil getting on the inner surface of the retainer, either by being thrown off from the inner ring 8, or otherwise, will be urged radially outwardly by centrifugal action, and will creep along the surfaces 13—13 toward the center and will be taken up by the balls in the retainer. Thus the balls will receive oil from the sloping surfaces 8—8 on the inner ring and also from the sloping surfaces 13—13 on the retainer and the balls and all of the surfaces in contact with the balls will be properly lubricated.

When the oil leaves the balls and retainer as by being thrown outwardly and passes generally axially outwardly to opposite sides of the retainer, it passes to means acting as a reservoir for holding lubricant. In the form shown, I provide a cap which will hold oil when the axis of the bearing is horizontal, as well as when the axis of the bearing is vertical, so that during ordinary holding of the bearing, there is little likelihood that any substantial amount of oil will be lost.

In the particular form shown, I employ a seal plate 14, which extends across the space between the rings and terminates short of the inner bearing ring. This seal plate 14, in the form shown, has an outer flange 15 which fits in a counterbore in the outer ring, as shown. A second seal plate 16 has a cup flange 17, fitting in the counterbore so that the two seal plates 14—16, in effect, may be said to form a channel cup opening radially inwardly so as to serve as a reservoir for oil. In addition to the seal plate 14, I prefer to provide another seal plate 18, which may be in all respects similar to the seal plate 14. The plates 14 and 18 are preferably apertured as shown at 19 so as to permit oil forced out beyond the retainer to enter the cup or reservoir and these apertures 19 are, therefore, located at about the inner diameter of the outer bearing ring.

In order to hold lubricant when the bearing is turned so that its axis is vertical, I prefer to provide additional cup means. In the form illustrated, the seal plate 16 has an axial cup flange 20 which receives a corresponding flange 21 carrying the generally radially outwardly directed flange or plate 22. This plate 22 preferably slopes slightly toward the plate 6; thus, if the bearing is placed so that its axis is vertical, the space between the plates 6 and 22 forms a substantial cup or reservoir for holding the oil which would ordinarily be held in the annular channel cup formed by the plates 14 and 16 as heretofore described.

In order to prevent the accidental loss of any oil leaking out or creeping along the inner bearing ring, I prefer to provide a slinger in the form of a slinger plate or flange 23 which may be carried on a short sleeve flange 24 riding on a rabbeted surface 25 on the inner ring. In the single row bearing in Fig. 1, I provide a seal at each side, and these seals are preferably duplicates of each other.

It will be seen that when the bearing is in operation, oil will be carried about to some extent by the retainer picking it up at the bottom or causing some turbulence so that the oil may run along the seal plates 14 or 18 and eventually run down and drop onto the sloping surfaces 8—8 on the inner ring. This oil, as heretofore described, will be forced centrifugally toward the center and to the balls, and some will be thrown off onto the inner surfaces of the retainer and carried centrifugally by the sloping surface 13 toward the center and onto the balls and other bearing surfaces. When the bearing is at rest, the oil seeps down into the reservoir heretofore noted and none is likely to be lost.

In the form shown in Fig. 3, the retainer is of slightly different form. It has the usual ball pockets and the cross section may be substantially as shown. Thus, there are two sloping surfaces 13' corresponding to the surfaces 13 on the retainer heretofore described. The retainer of Fig. 3 has a substantial lip therein, providing sloping surfaces 26—26, which surfaces slope generally radially and axially outwardly until they merge with the surfaces 13'—13' so that any oil on any of the inner surfaces of the retainer of Fig. 3 will be centrifugally urged to the balls carried in the ball pockets.

In that form shown in Fig. 4, a retainer 27 has a single sloping inner surface 28 which tends to carry oil centrifugally from the outside (left) toward and onto the balls and also to maintain the flow of oil toward the right as viewed in Fig. 4. This particular arrangement is particularly adapted for so-called duplex bearings which, by means of direct contact, as well as shims and sleeves, are often used in pairs and preloaded. With both bearings of a duplex pair provided with retainers 27, the oil may be forced to the center; that is to say, the center of the two bearings, or may be progressed across both bearings.

It will thus be seen, that I have provided means for very effectively lubricating bearings. I have, furthermore, provided means for holding a very substantial quantity of oil in a bearing and preventing loss thereof during any ordinary handling.

It will be noted that while my improved seal holds oil in the bearing and permits free lubrication, there is substantially no friction in the seals since in the preferred forms there are no contact seals.

While my invention has been described in considerable detail and preferred forms illustrated, it is to be understood that various changes may be made within the scope of the invention as defined in the appended claims.

I claim:

1. In an antifriction bearing, an outer bearing ring, an inner bearing ring and interposed antifriction bearing members, a retainer for said antifriction bearing members, said retainer having surfaces sloping from the outer sides thereof toward the center and having surfaces sloping generally radially and axially outwardly to meet said first mentioned surfaces whereby oil is carried centrifugally by all of said surfaces to the area of the antifriction bearing members carried by said retainer.

2. In an antifriction bearing member, an outer bearing ring, an inner bearing ring and interposed antifriction bearing members, a retainer for said antifriction bearing members, said retainer comprising an annular cage having openings for receiving said antifriction bearing members, said cage having radially inner surfaces sloping axially inwards and radially outwardly toward each other, and a generally radially directed rib between the axially inner ends of said sloping surfaces.

3. In an antifriction bearing, an outer bearing ring, an inner bearing ring and interposed antifriction bearing members, a seal for the space between said rings comprising a pair of generally radially inwardly directed annular flanges carried by said outer ring and spaced apart and terminating short of said inner ring, the outer of said annular flanges having axially inwardly and radially outwardly directed flanges to form an annular cup for holding lubricant when the axis of said bearing is vertical.

4. In the combination defined in claim 3, a slinger carried by said inner ring and extending into the space between the inner of said annular flanges and said generally radially outwardly directed flange for the purpose set forth.

5. In the combination defined in claim 3, the inner of said annular flanges having a transverse opening therein at about the inner diameter of the outer bearing ring.

6. In the combination defined in claim 3, and a second annular inwardly directed flange adjacent to but spaced from the inner of said two first mentioned annular flanges carried by said outer ring.

7. In an antifriction bearing, an outer bearing ring, an inner bearing ring and interposed antifriction bearing members, a seal plate carried by said outer bearing ring and extending across the space between said rings and toward the inner ring, said seal plate at its inner edge having an axially inwardly directed flange, a second plate having an annular flange interfitting with said axially inwardly directed flange, said second plate having a generally radially outwardly directed flange sloping toward said seal plate whereby a cup seal is formed which will hold oil when the axis of said bearing is horizontal as well as when the axis of said bearing is vertical.

8. In an antifriction bearing, an outer bearing ring, an inner bearing ring and interposed antifriction bearing members, said bearing having a bearing seal comprising a pair of adjacent spaced apart radially inwardly directed annular seal plates carried by said outer ring and terminating at their inner edges adjacent the inner bearing ring, said two seal plates having openings therethrough at about the inner surface of the outer bearing ring, a third annular inwardly directed seal plate carried by said outer ring and spaced from the next adjacent seal plate, said third seal plate at the inner edge having a generally radially outwardly directed flange spaced therefrom so as to provide a cup for holding lubricant, and a slinger carried by said inner bearing ring and extending into the space between said generally radially outwardly directed flange and one of said two first-mentioned seal plates.

References Cited in the file of this patent

UNITED STATES PATENTS

| | | |
|---|---|---|
| 1,068,116 | Eitner | July 22, 1913 |
| 1,254,332 | Lindhe | Jan. 22, 1918 |
| 1,325,113 | Rohn | Dec. 16, 1919 |
| 1,827,409 | Waring | Oct. 13, 1931 |
| 1,872,251 | Cowin | Aug. 16, 1932 |
| 1,951,042 | Walter | Mar. 13, 1934 |
| 1,986,621 | Bott | Jan. 1, 1935 |
| 2,067,464 | Smith | Jan. 12, 1937 |
| 2,101,013 | Leister et al. | Nov. 30, 1937 |
| 2,132,838 | Weckstein | Oct. 11, 1938 |

FOREIGN PATENTS

| | | |
|---|---|---|
| 479,290 | Great Britain | Jan. 31, 1938 |
| 678,992 | Great Britain | Sept. 10, 1952 |
| 676,648 | France | Feb. 25, 1930 |
| 746,597 | France | June 1, 1933 |
| 104,273 | Austria | Oct. 11, 1926 |